March 17, 1953     T. V. HANNO     2,631,777
PROCESS FOR CENTRIFUGAL SEPARATION OF YEAST CELLS FROM BEER
Original Filed Jan. 8, 1946
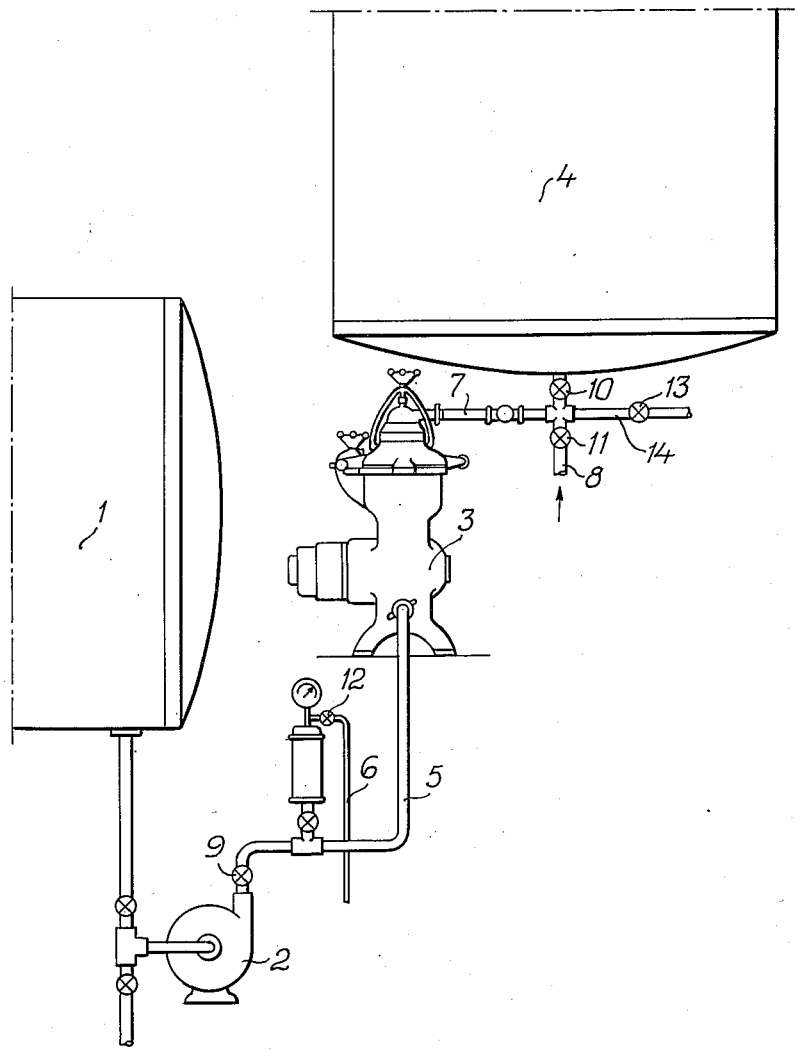
INVENTOR.
Tore Verner Hanno
BY
Davis, Hope & Faithfull Patented Mar. 17, 1953

2,631,777

UNITED STATES PATENT OFFICE 2,631,777

PROCESS FOR CENTRIFUGAL SEPARATION OF YEAST CELLS FROM BEER

Tore Verner Hanno, Stora Essingen, Sweden, assignor to Aktiebolaget Separator, Stockholm, Sweden, a corporation of Sweden Original application January 8, 1946, Serial No. 639,732, now Patent No. 2,502,945, dated April 14, 1952. Divided and this application August 17, 1949, Serial No. 110,862. In Sweden January 22, 1945

6 Claims. (Cl. 233—12)

This invention relates to the centrifugal separation of impurities from liquids, such as the separation of yeast cells from beer. More particularly, it relates to an improved process for this purpose, whereby contamination of the centrifugally purified liquid by the impurities, incident to interruption of the centrifugal separation, is avoided.

Centrifugal separators are now employed for removing from beer the yeast cells remaining after fermentation of the beer. The yeast cells, which are heavier than the beer, deposit under the influence of the centrifugal force in the sludge space at the peripheral part of the centrifugal bowl, where they are maintained until the centrifuge has been stopped. Thus, beer freed from yeast cells is discharged through the outlet of the centrifuge. Centrifuges of the hermetically closed type, an example of which is disclosed in Lindgren Patent No. 1,969,226, are generally used for the separation of the yeast cells, although the so-called paring disc centrifuges may also be used.

After the centrifuge is stopped, it is usually flushed clean by connecting its inlet to a water supply pipe and feeding water through it. At the same time an outlet, provided in the pipe line between the centrifuge outlet and the storage tank for the purified beer, is opened to prevent the flush water from entering this tank and contaminating the purified beer. Since the centrifugal bowl is not rotating during this passage of flush water through it, it is possible for yeast cells, which have previously been deposited in the sludge space of the bowl, to be carried away with the flush water flow and enter and remain in the discharge pipe line. When the centrifuge is used the next time for treating beer, these yeast cells may be carried into the storage tank for the purified beer. As yeast cells must not be present in the finished beer, the described procedure is open to serious objections.

It is possible, of course, by continuing the flushing for a very long time (e. g., for several hours), to achieve a more or less complete clean-flushing, in that the point is reached where the flush water removes no more yeast cells from the bowl, either because all the sludge mass containing yeast cells has been flushed out or because no more yeast cells are torn off by the flush water. This, however, involves a great waste of water and the necessity of attending to the installation long after the centrifuge has been stopped.

Even when the above-described flushing is effected in such a manner as to prevent yeast cells from remaining in the discharge line from the centrifuge, such cells may nevertheless reach the storage tank for the purified beer. That is, in stopping or starting the centrifuge, the bowl rotates for a considerable period of time at speeds less than the normal operating speed at which it is capable of effecting complete separation of the yeast cells from the beer. At these reduced speeds, the centrifugal bowl is incapable of separating and retaining the yeast cells, this incapacity being more pronounced, of course, at the lower speeds. For example, when starting the centrifuge, even though the beer initially passed through the bowl is not discharged into the purified beer tank, some of the yeast cells will nevertheless pass into the discharge line due to the incomplete separation at the lower speeds. These cells may easily become lodged in the discharge line, where they can be picked up by the flow of the subsequent beer which is piped to the purified beer tank when the bowl has attained its normal operating speed.

The principal object of the present invention is to provide an improved centrifugal process for separating impurities from beer and other liquids, whereby the above-mentioned difficulties are avoided.

According to the invention, contamination of the purified beer in the storage tank is avoided by a process which prevents the yeast cells from entering the discharge line from the centrifuge, so that there is no opportunity for such cells to become lodged in this line and eventually reach the purified beer tank. In the practice of the process, the beer to be purified is fed through an inlet to a centrifugal bowl or locus of centrifugal force which, in normal operation, rotates at an operating speed sufficient to separate the yeast cells centrifugally from the beer, the purified beer being discharged continuously through an outlet from the centrifugal bowl and through a discharge path to the storage tank or zone, in accordance with the usual procedure. However, when the centrifuging is interrupted, as is the case when flushing of the bowl is effected, the supply of the impurity-containing beer to the bowl inlet is withheld while the bowl is rotating at speeds less than the aforesaid operating speed. At the same time, that is, while the bowl is rotating at reduced speed, a flushing liquid is forced under pressure into the discharge path for the purified beer and thence through the bowl outlet, the interior of the rotating bowl and its inlet, in a direction opposite to that of the beer flow. This reverse flushing may also be effected or continued while the bowl is stationary, to provide a more complete removal of the yeast cells remaining in the bowl after its rotation has stopped. By using a centrifuge of the hermetically closed or "air-tight" type previously mentioned, no special provision is necessary to permit the reverse flushing while the bowl is rotating at reduced speeds, because centrifuges of this type are characterized by an inlet and outlet which are hermetically sealed at all times.

The flush liquid forced into the discharge path for the purified beer will thus perform two functions. First, it acts in effect as a dam to block the entrance of yeast cells into the discharge path from the bowl while the latter is rotating at reduced speeds. Secondly, at the lower speeds at least and, if desired, while the bowl is stationary, it forms a liquid stream flowing reversely through the bowl to flush retained yeast cells out of the bowl by way of its inlet. Any yeast cells lodged in the bowl inlet or remaining in the bowl itself, in spite of the reverse flushing, cannot contaminate the purified beer because the discharge path for the latter is unblocked by the flush liquid only when the bowl has attained its normal operating speed, at which time the yeast cells are retained centrifugally in the bowl.

For a better understanding of the invention, reference may be had to the accompanying drawing, in which the single illustration is a diagrammatic view of a preferred installation for use in practicing the process.

The beer to be purified, which is contained in a tank 1, is pumped by means of a centrifugal pump 2 through a centrifugal separator 3 of the clarifier type, the single outlet of which serves to discharge the centrifugally purified beer. The latter, which is thus freed from yeast cells, passes to a storing tank or so-called pressure tank 4 for the purified beer. The centrifuge 3 is of the hermetically closed or "air-tight" type, as disclosed in the aforementioned Lindgren Patent No. 1,969,226, wherein both the bowl inlet and the bowl outlet are sealed from the atmosphere. The yeast cells, being heavier than the beer, move outwardly into the sludge space in the peripheral part of the bowl, where they are retained during the normal operation of the centrifuge. Connected to the feed pipe 5 between the pump and the centrifuge inlet is an outlet pipe 6 for flush liquid; and connected to the discharge pipe 7 between the centrifuge outlet and the pressure tank 4 is an inlet pipe 8 for flush liquid. The discharge line 7 between the centrifuge outlet and the pressure tank 4 can be opened or closed by a valve 10 located between the flush liquid inlet pipe 8 and the tank 4. A valve 9 is disposed in the feed pipe 5 between the pump 2 and the flush liquid outlet pipe 6. During the separating operation, the pipes 8 and 6 are closed by valves 11 and 12, respectively, and the valves 9 and 10 are open. The pipe 8 constitutes a supply line for water or other flush liquid at a pressure at least as great as the pressure existing in the discharge line 7 during the separating operation, that is, while the centrifuge bowl or locus of centrifugal force is rotating at its normal speed for centrifugal separation of the impurities from the beer.

During the centrifuging, the beer to be purified flows from the tank 1 through the pump 2 and the pipe 5 into the centrifuge 3, where the yeast cells are separated from the beer and retained in the peripheral sludge space of the centrifugal bowl, the purified beer passing through the bowl outlet and discharge pipe 7 into the tank 4. In this separating operation, the bowl of the centrifuge is driven at its normal speed for separating and retaining the yeast cells.

When the centrifuging is to be interrupted, the bowl of the centrifuge 3 is disconnected from its power source, whereupon the speed of rotation of the bowl begins to decrease. However, simultaneously with the uncoupling of the bowl from its power source, or at least before the speed of the bowl decreases to the point where it is incapable of separating and retaining the yeast cells, the valves 9 and 10 are closed and the valves 11 and 12 are open. At this moment the discharge pipe 7 is filled with purified beer, and no yeast cells have entered the pipe 7 because the rotational speed of the bowl has been sufficient to separate the yeast cells and retain them in the peripheral part of the bowl. While the bowl is rotating at reduced speeds, the flushing liquid flows from pipe 8 into pipe 7 and thence through the bowl outlet, the interior of the bowl, its inlet, and pipes 5 and 6, the flush liquid being discharged from pipe 6 into a suitable receptacle or to waste. Accordingly, during such time as the bowl is rotating at speeds insufficient for separating the yeast cells and retaining them in the sludge space, it is impossible for the yeast cells to enter the bowl outlet or discharge pipe 7, since this is prevented by the blocking action or reverse flow of the flushing liquid in the discharge pipe and the centrifuge. Not only does the flush liquid prevent yeast cells from entering the bowl outlet and discharge line 7, but it also acts to flush yeast cells from the sludge space of the bowl through the bowl inlet and the pipes 5 and 6. When the bowl has ceased rotating, the reverse flow of the flushing liquid is preferably continued to effect a more complete flushing of the bowl. When it is desired to terminate the flushing operation, the valve 11 is closed.

When the separating operation is to be resumed, the bowl of the centrifuge 3 is re-connected to its power source, at which time the valves 9 and 10 are closed and valves 11 and 12 are opened. As the bowl begins to rotate, flushing liquid will therefore enter the discharge pipe 7 from the supply pipe 8 and then flow in reverse direction through the centrifuge 3, from which it is discharged as previously described through pipes 5 and 6. This reverse flow is continued throughout the period during which the bowl rotates at speeds less than the normal speed at which it is capable of retaining the yeast cells in the sludge space, and consequently it is impossible for any cells remaining in this space to enter the bowl outlet or the discharge pipe 7. When the bowl attains its normal operating speed, and is therefore capable of preventing yeast cells from entering the bowl outlet and the discharge pipe 7, the valve 12 is closed and the valve 9 is opened. At this time, liquid flow is effected in the normal direction through the bowl, either by relieving the pressure in the flush liquid supply pipe 8 so that the flush liquid in the bowl and the discharge path 7 is displaced through pipe 8 by the incoming beer, or by closing the valve 11 and opening a valve 13 in a draw-off pipe 14 leading from the discharge line 7. The latter arrangement may be used when it is desired to maintain in the pipe 8 at all times a liquid pressure at least as great as the pressure in pipe 7 when the bowl has attained its normal operating speed. In either case, the flushing liquid in advance of the beer admitted through valve 9 is forced out of the discharge line 7 without entering the tank 4 and without carrying any yeast cells from the bowl into the discharge path 7. When beer begins to flow out through the pipe 8 or through pipe 14, whichever is used for discharging the flush liquid, then the corresponding valve 11 or 13 is closed and the valve 10 is opened to allow the purified beer to enter the pressure tank 4 from the centrifuge.

It will be apparent from the foregoing that in the practice of the new method the flush liquid from pipe 8 acts in a dual capacity to remove yeast cells from the centrifugal bowl by reverse flushing and also to prevent yeast cells from entering the bowl outlet or the discharge pipe 7 incident to starting or stopping the centrifuge, that is, during such times as the centrifugal bowl is rotating at speeds insufficient for the bowl to retain yeast cells in its sludge space. When the bowl is uncoupled from its power source, its rotational speed decreases quite gradually due to the inertia of the bowl. Therefore, assuming that the pressure maintained in the flush liquid supply pipe 8 is the same as the pressure existing in discharge pipe 7 during normal operation of the bowl, the flushing liquid upon opening of valve 11 can only balance the pressure from the beer in the centrifuge while the uncoupled bowl is rotating at approximately its normal speed. However, this balancing of pressures serves to prevent any flow from the bowl through its outlet and thereby blocks the entrance of yeast cells into discharge pipe 7. As the rotational speed of the bowl decreases, the pressure of the flushing liquid in pipe 8 gradually overcomes the pressure or the reverse flow resistance in the centrifuge, so that the flushing liquid flows at a gradually increasing rate through the centrifuge in a direction opposite to that of the beer flow during the separating operation. As the rate of the reverse flow of flushing liquid increases, incident to the decreasing speed of the bowl, the flush liquid exerts a more effective action in removing yeast cells from the bowl through the pipes 5 and 6.

In starting the centrifuge, when the rotational speed of the bowl is initially very low, the flushing liquid flows at a relatively high rate in the reverse direction through the bowl. As the bowl speed increases, the resistance to reverse flow of flushing liquid through the bowl also increases, and when the bowl reaches its normal operating speed the pressure in the flush liquid supply pipe 8 will merely balance the pressure of the liquid in the centrifuge, assuming that the pressure maintained in pipe 8 is the same as the pressure existing in pipe line 7 during normal operation of the centrifuge. At this point, flow of flushing liquid and then beer in the normal direction from the bowl into the discharge path 7 will not result in entrance of yeast cells into the discharge path 7, because the bowl is now rotating at a speed sufficient to retain the yeast cells in the sludge space of the bowl.

If desired, the pressure in the flush liquid supply pipe 8 may be maintained sufficiently high to force the flush liquid in the reverse direction through the bowl even when the latter attains its normal speed in starting or continues to rotate at approximately normal speed when the bowl is first disconnected from its power source. In other words, by controlling the pressure in the flush liquid supply pipe 8, the flush liquid may be made to form either a stationary dam or a reversely moving dam while the bowl is rotating at approximately its normal speed with the valves 9 and 10 closed and the valves 11 and 12 open.

With the new process, it will be understood that it is not necessary to effect complete removal of yeast cells from the centrifugal bowl by the flushing action, since yeast cells from the bowl interior are prevented at all times from entering the bowl outlet and the discharge line 7.

This application is a division of my co-pending application Serial No. 639,732, filed January 8, 1946, and issued April 4, 1950, as Patent No. 2,502,945.

I claim:

1. In the separation of yeast cells or other impurities from beer or other liquid in a closed system, by feeding the liquid containing such impurities through a feed path to an inlet to a rotating locus of centrifugal force while driving said locus at an operating speed of rotation sufficient to separate the impurities centrifugally from the liquid, and discharging the purified liquid through an outlet from the locus and through a discharge path to a storage zone, and in which said driving of the locus is interrupted incident to interruption of the centrifugal separation, the improvement which comprises withholding the supply of impurity-containing liquid to said inlet and closing a part of said discharge path while the locus is rotating at reduced speeds less than said operating speed, and simultaneously, while the locus is rotating at said reduced speeds, forcing a flush liquid under pressure into said discharge path at a region between said closed part and said outlet and thence through said outlet, rotating locus, inlet and part of said feed path, in a direction opposite to that of the liquid to be purified.

2. The improvement according to claim 1, in which the flush liquid is forced into the discharge path at a rate which varies inversely with the rotational speed of the locus.

3. The improvement according to claim 1, in which the flush liquid is forced into the discharge path under a pressure substantially equal to the pressure normally existing in the discharge path during said centrifugal separation.

4. The improvement according to claim 1, in which the flush liquid is forced in said opposite direction through the locus at a gradually decreasing rate as the locus rotation approaches said operating speed, and comprising also, when said operating speed is attained, resuming the supply of impurity-containing liquid to said inlet, discontinuing the supply of flush liquid to said path and displacing flush liquid therefrom by the other liquid, and then opening said part of the discharge path to discharge the purified liquid from the locus to the storage zone.

5. The improvement according to claim 1, in which, upon interruption of said driving and while the locus is still rotating at approximately said operating speed, the flush liquid is applied to the discharge path at a pressure which initially substantially balances the purified liquid pressure at said outlet but which gradually overcomes said last pressure upon decrease in the rotational speed of the locus, whereby flow of the flush liquid in said opposite direction through the locus is effected at a gradually increasing rate.

6. The improvement according to claim 5, in which flow of the flush liquid in said opposite direction through the locus is continued after the locus has ceased rotating.

TORE VERNER HANNO.

REFERENCES CITED

The following references are of record in the file of this patent:

UNITED STATES PATENTS

| Number | Name | Date |
|---|---|---|
| 544,080 | Bachmann | Aug. 6, 1895 |
| 2,003,621 | Andersson | June 4, 1935 |